UNITED STATES PATENT OFFICE.

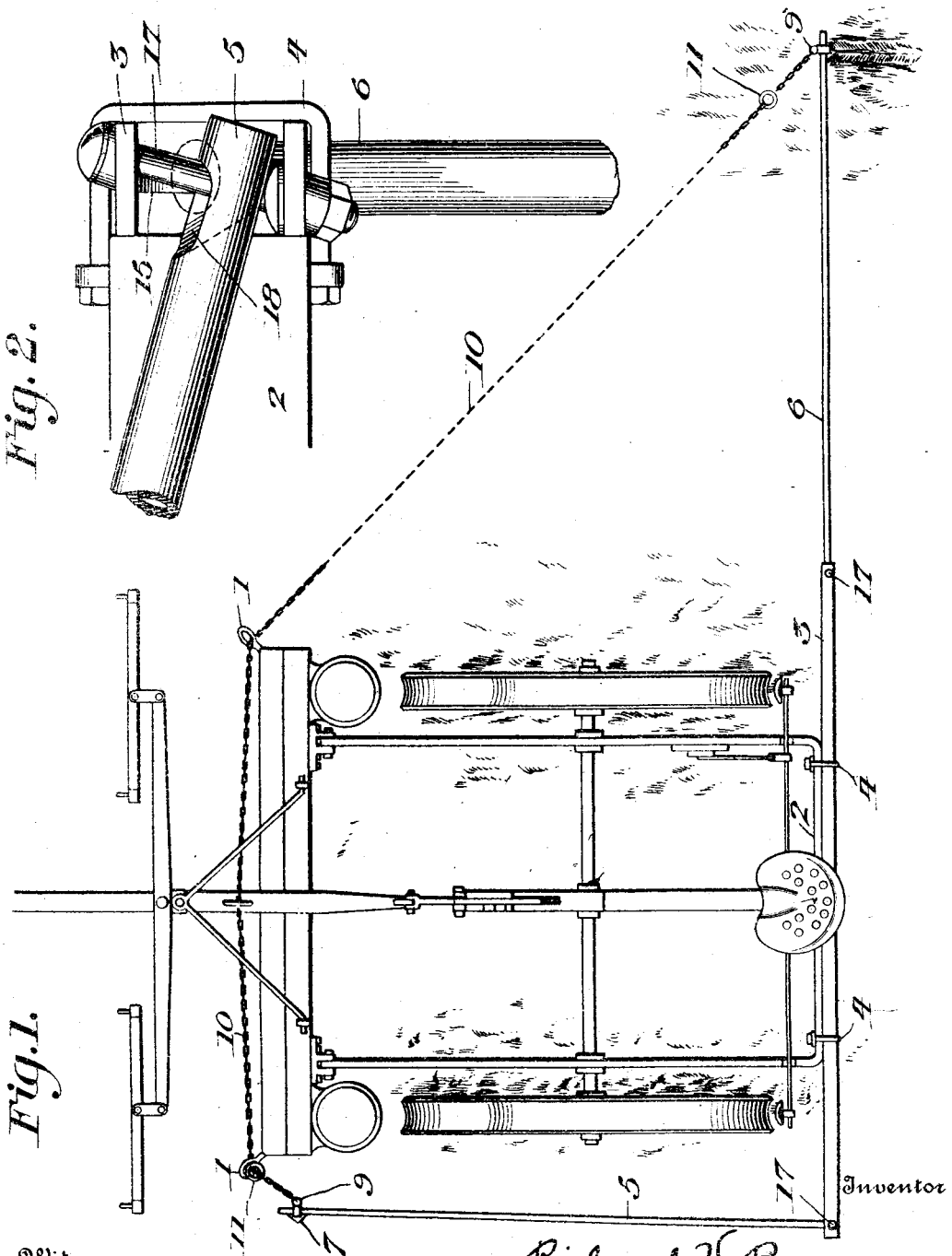

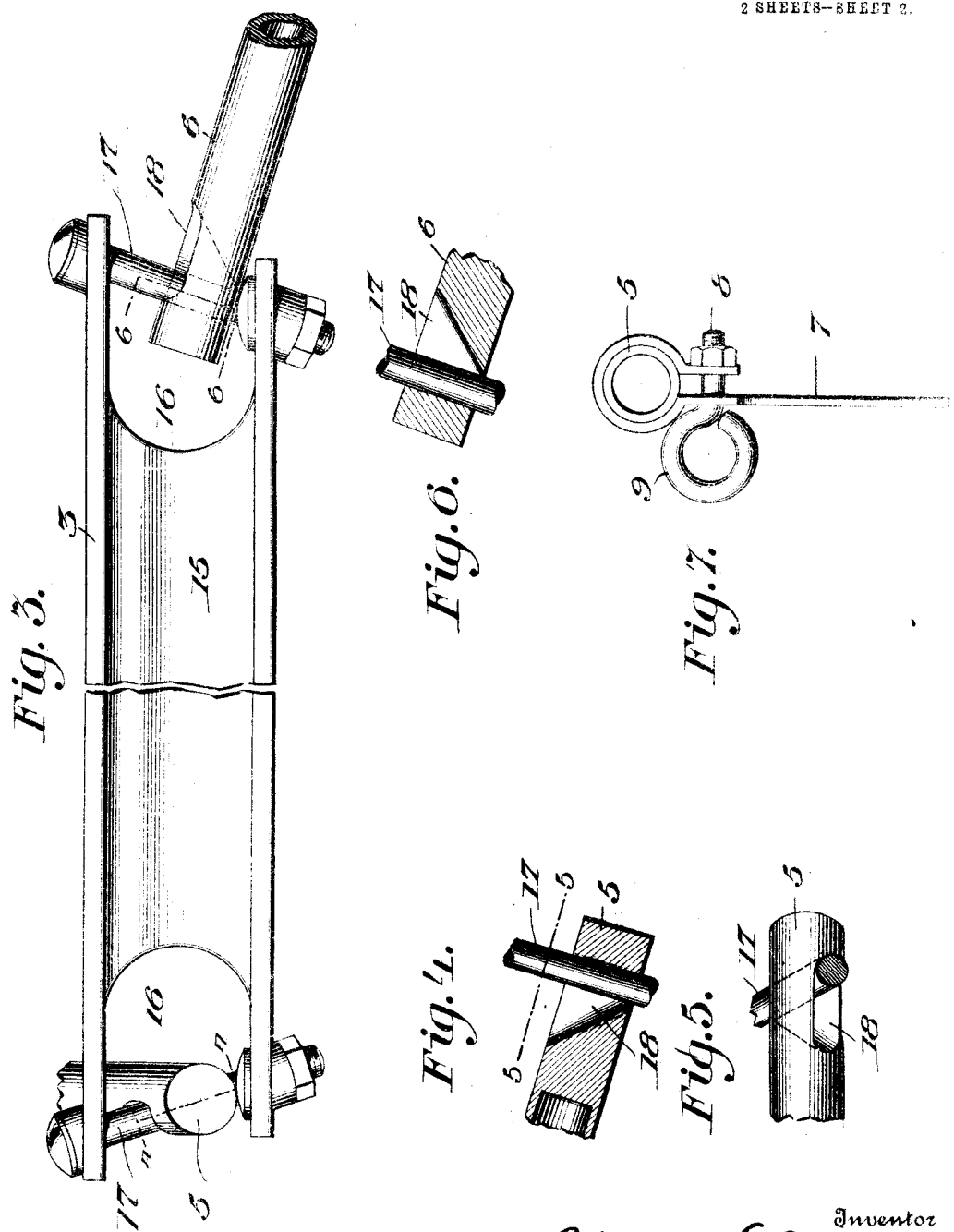

RICHARD V. BARRY, OF OTTUMWA, IOWA.

LAND-MARKER.

1,086,983.

Specification of Letters Patent.

Patented Feb. 10, 1914.

Application filed July 10, 1913. Serial No. 778,289.

*To all whom it may concern:*

Be it known that I, RICHARD V. BARRY, citizen of the United States, residing at Ottumwa, in the county of Wapello and State of Iowa, have invented new and useful Improvements in Land-Markers, of which the following is a specification.

My present invention pertains to land markers such as are ordinarily used on corn planters and the like, and it contemplates the peculiar and advantageous land marker, hereinafter described and claimed, calculated to operate automatically at the end of each traverse across a field.

In the drawings accompanying and forming part of this specification: Figure 1 is a plan view illustrating a corn planter equipped with a land marker constructed in accordance with my invention. Fig. 2 is an enlarged detail view taken from a point at the left-hand side of the machine and showing the marker-arm at the left-hand side of the machine in its raised and idle position, and also showing the land-marker arm at the right-hand side of the machine in its working position. Fig. 3 is a broken rear elevation showing the marking arms in the same positions as in Fig. 1, and also showing the bar with which the said arms are connected. Fig. 4 is a fragmentary section taken in the plane indicated by the line 4—4 of Fig. 3. Fig. 5 is a detail section taken on the line 5—5 of Fig. 4, looking downwardly. Fig. 6 is a fragmentary section taken on the line 6—6 of Fig. 3. Fig. 7 is a detail view illustrating the manner in which I prefer to connect each marker to its complementary arm.

Similar numerals of reference designate corresponding parts in all of the views of the drawings.

The corn planter shown is of the ordinary construction.

In furtherance of my invention, the frame of the said planter is provided at its forward corners with guide eyes 1, and is equipped on the rear portion of its frame 2 with a transverse bar 3. This bar 3 is shown at 4 as shackled to the frame 2, but manifestly it may be fixed on the rear of the frame in any approved manner without affecting my invention. Loosely connected with the ends of the bar 3, are the land-marking arms, the left-hand arm being numbered 5, and the right-hand arm 6. In the preferred embodiment of my invention the marking blades 7 are clipped or clamped on the arms, and the clamping bolt 8 is shaped as indicated by 9 in Fig. 7 to form an eye. The eyes 9 of the two arms are connected by a cable 10, preferably in the form of a chain, as shown in Fig. 1. The said cable 10, is carried through the guide eyes 1 in a loose manner, and is equipped with stops 11, which have for their function to limit the upward movement and inward movement of the arms adjacent thereto.

My improved marking means is adapted to operate automatically. In other words when the machine with the marking arms positioned as shown in Fig. 1 reaches the end of its traverse and is turned, the turning of the machine toward the right or toward the left the same as to right will bring about the movement of the marking arm 6 toward the adjacent side of the machine, and the movement of the arm 5 from the position shown at the left of Fig. 1 to a position in line with the bar 3, and at a right-angle to the length of the planter frame. To enable the marker to operate as stated, the arms 5 and 6 are connected to the bar 3 in the manner that will now be described.

The bar 3 is preferably, though not necessarily, of I-form in cross-section, and the web 15 of the bar is cut away at the ends thereof so as to afford play spaces 16 between the upper and lower flanges of the bar. Carried by the said flanges and extending across the said play spaces are pintles 17. These pintles are inclined upwardly and rearwardly, as shown in Fig. 2, and upwardly and laterally outward as shown in Fig. 3. It will also be seen by reference to Figs. 3 to 6, that each of the arms 5 and 6 is provided adjacent its inner end with an aperture 18 to loosely receive the respective pintle of the arm. The said apertures 18 are of the shape best shown in Fig. 3. By reference to said figure, and particularly to the arm 6 therein, it will be seen that the upper end of the aperture 18 is elongated in the direction of the length of the arm, and that the end wall of the aperture remote from the inner end of the arm, is inclined upwardly and outwardly. By virtue of this provision it will be manifest that the arm will tend to swing and gravitate to the position shown at the right of Figs. 1 and 6; and it will also be manifest that when the arm is moved inwardly and upwardly by the draft on the cable 10, the arm is free to so move until its stop 11 brings up against the complementary guide eye 1. Again, when the arm is in a position parallel to the frame of the planter and is released, the arm will tend to swing outwardly and downwardly to the position shown at the right of Fig. 1. It will also be appreciated that the operation just described is true of the arm 5 after the machine is turned toward the right from the position shown in Fig. 1.

It will be readily gathered from the foregoing that the bar 3 of I-form in cross-section lends itself readily to the peculiar connection of the arms 5 and 6, because of the facility with which the play spaces 16 can be provided at the ends of the said bar. I therefore prefer to employ a bar 3 of I-form in cross-section, though I do not desire to be understood as limiting myself to such specific bar.

Having described my invention, what I claim and desire to secure by Letters-Patent, is:—

1. The combination of a carrier having guiding means on its forward portion, a transverse bar fixed at the rear portion of the carrier and having extended upper and lower portions and play spaces between said portions, inclined pintles carried by said extended portions and intersecting said play spaces, marking arms having apertures receiving said pintles; said aperture being disposed and shaped to enable the arms to swing inwardly and upwardly and outwardly and downwardly, and a cable passed through the guiding means and connected to the marking arms.

2. In a land marking machine, the combination of a carrier, a transverse bar fixed at the rear portion of the carrier and having extended upper and lower portions and play spaces between said portions, rearwardly and outwardly and upwardly inclined pintles carried by said portions and intersecting said spaces, and marking arms having apertures loosely receiving the said pintles; each of said apertures being elongated in the direction of the length of the respective arms thereof and having an inner end wall that is square and also having an outer upwardly and outwardly inclined end wall.

3. In a land marking machine, the combination of a carrier, a transverse bar, of I-form in cross-section, fixed at the rear portion of the carrier and having its web cut away at its ends to form upper and lower extended portions and play spaces between said portions, pintles carried by said portions and intersecting said spaces, and marking arms loosely mounted on said pintles.

In testimony whereof I have hereunto set my hand in presence of two subscribing witnesses.

RICHARD V. BARRY.

Witnesses:
O. L. SHADFORD,
R. S. THOMAS.